United States Patent
Chang et al.

(10) Patent No.: US 8,305,345 B2
(45) Date of Patent: Nov. 6, 2012

(54) MULTIMEDIA PLAYING DEVICE

(75) Inventors: Chien-Wei Chang, Taipei (TW);
Chen-Ping Yang, Taipei (TW)

(73) Assignee: Life Technologies Co., Ltd. (TW)

( * ) Notice: Subject to any disclaimer, the term of this patent is extended or adjusted under 35 U.S.C. 154(b) by 1126 days.

(21) Appl. No.: 12/187,448

(22) Filed: Aug. 7, 2008

(65) Prior Publication Data
US 2010/0036988 A1 Feb. 11, 2010

(51) Int. Cl.
*G09G 5/08* (2006.01)
*G06F 3/033* (2006.01)

(52) U.S. Cl. .................................. 345/158; 345/156
(58) Field of Classification Search .................. 345/156, 345/158; 710/100, 300
See application file for complete search history.

(56) References Cited

U.S. PATENT DOCUMENTS

| | | | | |
|---|---|---|---|---|
| 5,594,469 A * | 1/1997 | Freeman et al. | ............... | 345/158 |
| 6,335,977 B1 * | 1/2002 | Kage | ............... | 382/107 |
| 6,600,475 B2 * | 7/2003 | Gutta et al. | ............... | 345/156 |
| 6,654,001 B1 * | 11/2003 | Su | ............... | 345/156 |
| 6,738,041 B2 * | 5/2004 | Silber | ............... | 345/158 |
| 6,747,632 B2 * | 6/2004 | Howard | ............... | 345/158 |
| 6,803,906 B1 * | 10/2004 | Morrison et al. | ............... | 345/173 |
| 7,710,391 B2 * | 5/2010 | Bell et al. | ............... | 345/156 |
| 7,911,447 B2 * | 3/2011 | Kouno | ............... | 345/158 |
| 8,144,121 B2 * | 3/2012 | Kitaura | ............... | 345/156 |
| 2001/0012001 A1 * | 8/2001 | Rekimoto et al. | ............... | 345/173 |
| 2002/0057383 A1 * | 5/2002 | Iwamura | ............... | 348/734 |
| 2003/0214486 A1 * | 11/2003 | Roberts | ............... | 345/173 |
| 2004/0149892 A1 * | 8/2004 | Akitt et al. | ............... | 250/221 |
| 2005/0039128 A1 * | 2/2005 | Hsu et al. | ............... | 715/728 |
| 2006/0252474 A1 * | 11/2006 | Zalewski et al. | ............... | 463/1 |
| 2008/0001951 A1 * | 1/2008 | Marks et al. | ............... | 345/474 |

* cited by examiner

*Primary Examiner* — Joe H Cheng
(74) *Attorney, Agent, or Firm* — Schmeiser, Olsen & Watts, LLP

(57) ABSTRACT

A multimedia playing device includes a central processing unit, a plurality of sensors electrically coupled to the central processing unit, and an output unit electrically coupled to the central processing unit. The plurality of sensors are operated together with the central processing unit, such that after the sensors detect different hand movements of a user, the central processing unit reads and determines the hand movement and transmits related control signals to the output unit according to different hand movements to achieve the effects of using a hand posture to control related functional movements and enhancing the convenience of using the multimedia playing device.

14 Claims, 4 Drawing Sheets

MULTIMEDIA PLAYING DEVICE

FIELD OF THE INVENTION

The present invention relates to a multimedia playing device, and more particularly to a multimedia playing device that uses a plurality of sensors operated together with a central processing unit for controlling a transmission of related control signals to an output unit according to different hand movements, so as to achieve the effects of controlling related functions by different hand postures and enhancing the convenience of using the multimedia playing device.

BACKGROUND OF THE INVENTION

In general, a conventional multimedia player 7 (as shown in FIG. 1) includes a display screen 71, a speaker 72, a power switch 73 and a plurality of function keys 74. The power switch 73 is provided for turning on/off the multimedia player 7, and the display screen 71 and the speaker 72 are provided for outputting related audio/video information, and each function key 74 is provided for controlling related operations to achieve the required audio/video playing effect.

Although the aforementioned conventional multimedia player 7 can achieve the required audio/video playing effect by the display screen 71, the speaker 72, the power switch 73 and the plurality of function keys 74, users need to touch and press the power switch 73 and the plurality of function keys 74 directly for the operation of the power switch 73 and the plurality of function keys 74 to execute related functions. The use of the multimedia player 7 is inconvenient, when there is a relatively long distance between the multimedia player 7 and users. To overcome the drawback of the aforementioned prior art, manufacturers have developed a sense-controlled multimedia player 8 (as shown in FIG. 2). In this multimedia player 8, a sensor 82 is installed at the top of a display screen 81, and a plurality of function keys 83 are disposed on the multimedia player 8, and the sensor 82 and the multimedia player 8 are electrically connected to electric power, such that after a user at a remote end blocks the sensor 82 by a hand 5, the user can turn on/off the electric power to achieve the effect of powering on/off the multimedia player 8.

Although the sense-controlled multimedia player 8 can be operated together with the sensor 82 to let a user at a remote end turn on/off the multimedia player 8, the application is limited to the use of powering on/off the multimedia player 8 only, but it does not allow the user to control the function keys 83. Obviously, the conventional multimedia player 8 requires further improvements to meet user requirements.

SUMMARY OF THE INVENTION

Therefore, the primary objective of the present invention is to provide a multimedia playing device, wherein a plurality of sensors are operated together with a central processing unit, such that after the sensors detect different hand movements of a user, the central processing unit reads and determines the hand movements to control transmitting control signals to an output unit according to the different hand movements, so as to achieve the effects of controlling the operation of related functions and enhancing the convenience of using the multimedia playing device.

To achieve the foregoing objective, the present invention provides a multimedia playing device comprising: a central processing unit having a digital signal processing unit, a memory unit and a buffer unit electrically coupled with each other; a plurality of sensors electrically coupled to the digital signal processing unit; and an output unit electrically coupled to the digital signal processing unit, and the output unit includes a display screen.

DESCRIPTION OF THE PREFERRED EMBODIMENT

The above and other objects, features and advantages of the present invention will become apparent from the following detailed description taken with the accompanying drawing.

Figure 1:
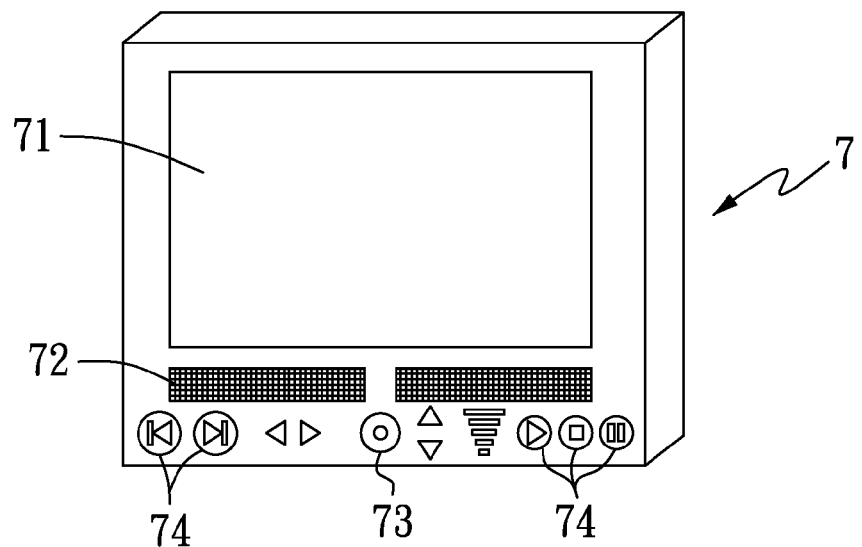
FIG. 1 is a perspective view of a prior art.
Figure 2:
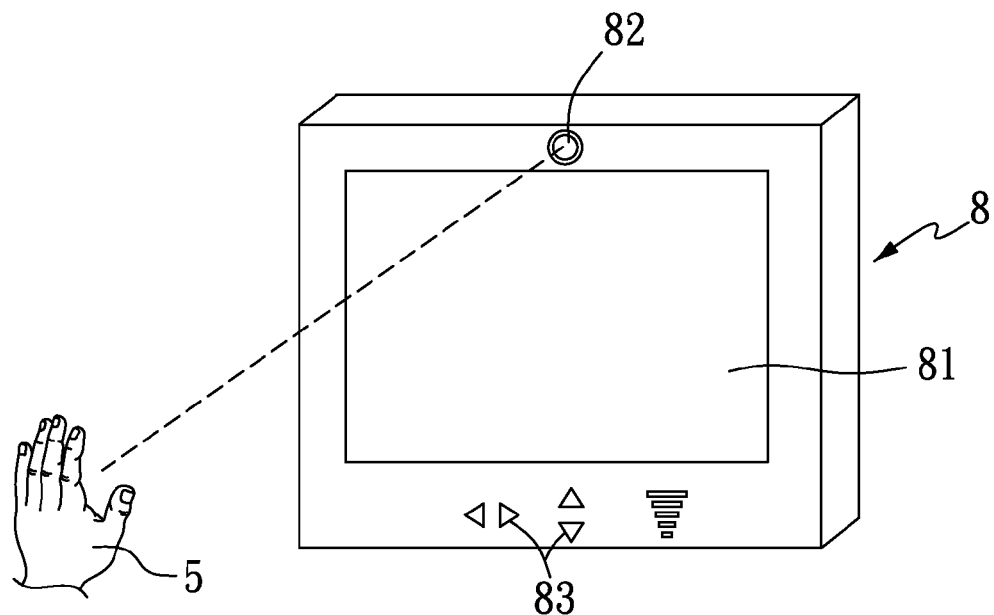
FIG. 2 is a perspective view of another prior art.
Figure 3:
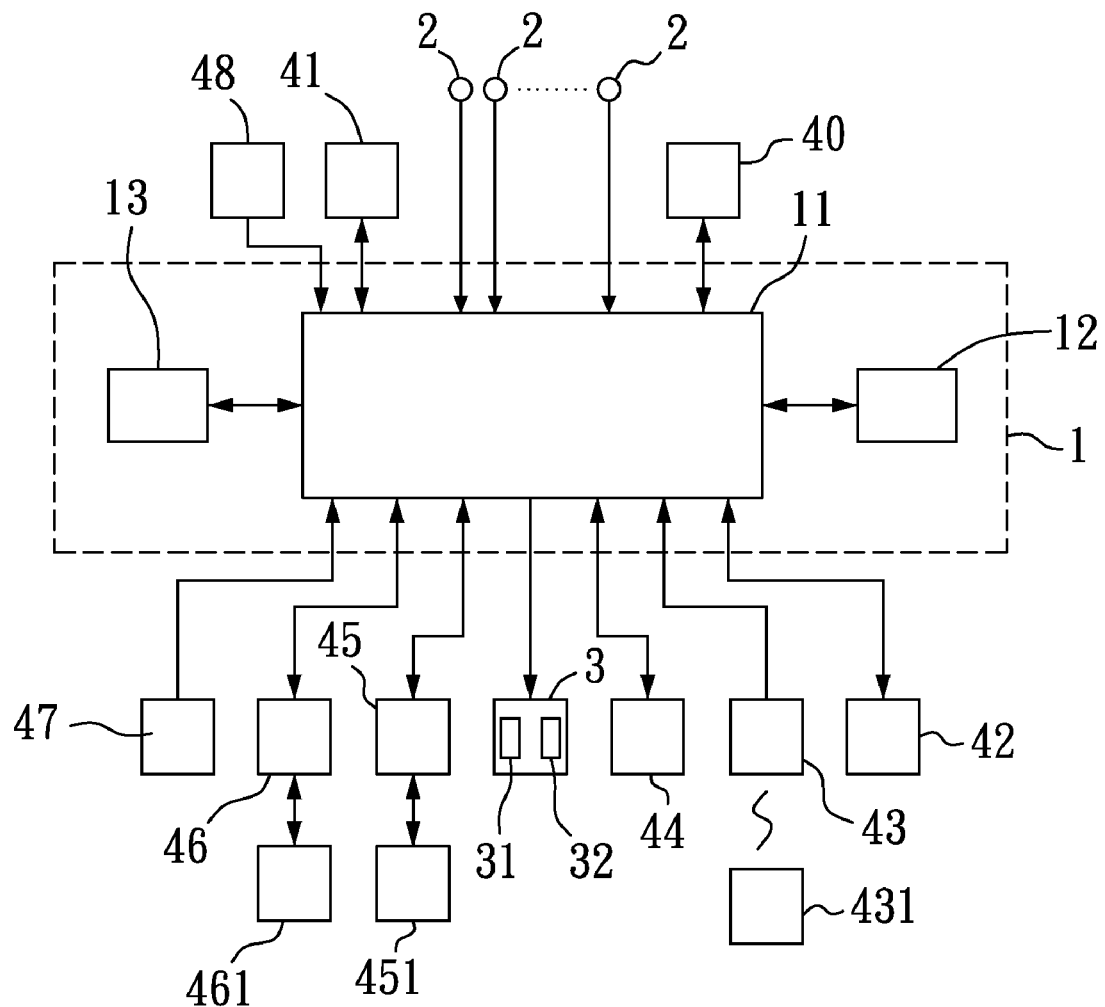
FIG. 3 is a schematic view of a basic architecture of the invention.

With reference to FIG. 3 for a basic architecture of the present invention, a multimedia playing device of the invention comprises a central processing unit 1, a plurality of sensors 2 and an output unit 3.

The central processing unit 1 includes a digital signal processing unit 11, a memory unit 12 and a buffer unit 13 electrically coupled with one another. The sensors 2 are electrically coupled to the digital signal processing unit 11, and the output unit 3 is electrically coupled to the digital signal processing unit 11, and the output unit 3 includes a display screen 31. The foregoing structure constitutes a novel multimedia playing device.

The sensors 2 are infrared sensors or one complementary metal oxide semiconductor (CMOS) and one charge coupled device (CCD) respectively.

The memory unit 12 is a memory or a hard disk, and the buffer unit 13 is a memory, and the output unit 3 further includes a speaker 32.

The multimedia playing device of the invention further comprises a power supply unit 48 electrically coupled to the digital signal processing unit 11 for supplying electric power to the multimedia playing device.

The multimedia playing device of the invention further comprises a camera unit 40, a flash light 41, a USB port 42, a remote controller 43, a card reader 44, an audio decoder 45, an audio/video transmitter 46, a microphone 47 or any combination of the above, electrically coupled to the digital signal processing unit 11, wherein the remote controller 43 includes a remote-control receiver 431, and the audio decoder 45 is connected to an earphone 451, and the audio/video transmitter 46 is connected to an audio/video input/output unit 461.

Figure 4:
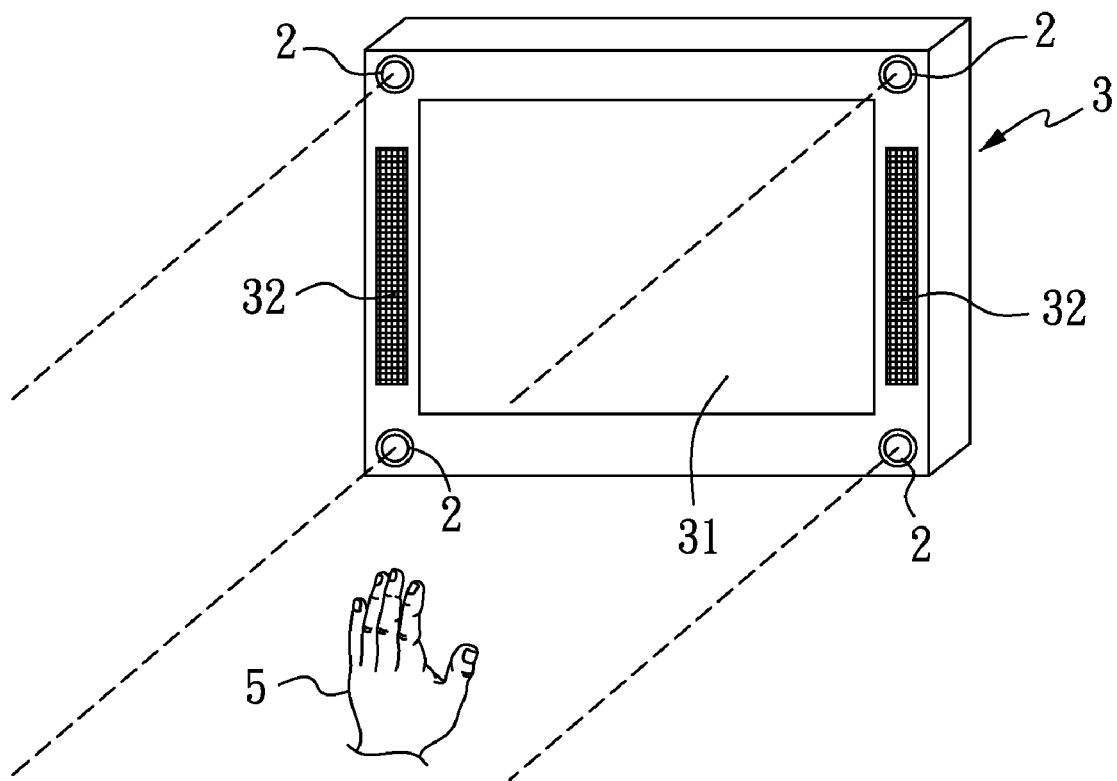
FIG. 4 is a schematic view of an application using an infrared sensor in accordance with the present invention.

With reference to FIG. 4 for a schematic view of operating a multimedia playing device by using an infrared sensor in accordance with the present invention, when the invention is applied (also refer to FIG. 3), each sensor 2 is an infrared sensor, and signals of related movements of a hand are stored in a memory unit 12 in advance. For example, the hand 5 moving from left to right stands for a first movement, from right to left for a second movement, from top to bottom for a third movement, from bottom to top for a fourth movement, from upper left to lower right for a fifth movement, from lower left to upper right for a sixth movement, from upper right to lower left for a seventh movement, from lower right to upper left for an eight movement, and so on, and the movements 1 to 9 generate related function control signals such as power-on, power-off, selecting channel, high volume, low volume, pause, fast forward and slow forward respectively.

When the multimedia playing device is used, a related function control signal controls a display screen 31 or a speaker 32 of the output unit 3, such that if a user wants to carry out a related function, the user needs to face the multimedia playing device and perform a hand posture of a related hand movement. After each sensor 2 detects and receives different movements of the user's hand 5, the movements are stored in the buffer unit 13, such that the digital signal processing unit 11 reads and compares the related settings in the memory unit 12 with the current movements of the hand in the buffer unit 13, and the digital signal processing unit 11 transmits a related control signal according to different movements of the hand 5 to execute a function corresponding to the hand posture and control a related operation of the output unit 3, so as to achieve the convenience of using the multimedia playing device When the present invention is applied, a digital signal processing unit 11 is operated together with the camera unit 40 and the flash light 41 for capturing an image, and the USB port 42 is connected to related electronic peripherals, and the remote controller 43 works together with the remote-control receiver 431 for carrying out the operation of related functions, and the card reader 44 is inserted for reading a related memory card, and the audio decoder 45 and the audio/video transmitter 46 transmits and plays sound and video signals through an earphone 451 and an audio/video input/output unit 461 respectively, and the microphone 47 inputs and amplifies the sound signal and outputs the sound signal from the speaker 32 to the output unit 3 to achieve the effect of playing the multimedia playing device.

Figure 5:
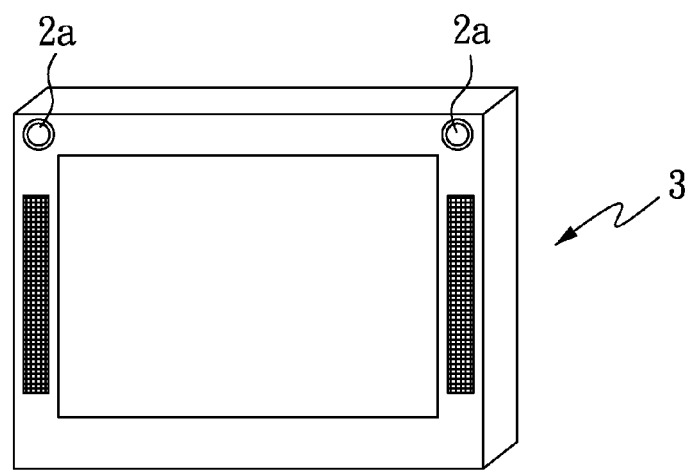
FIG. 5 is a schematic view of an architecture using a CMOS or CCD sensor in accordance with the present invention.
Figure 6:
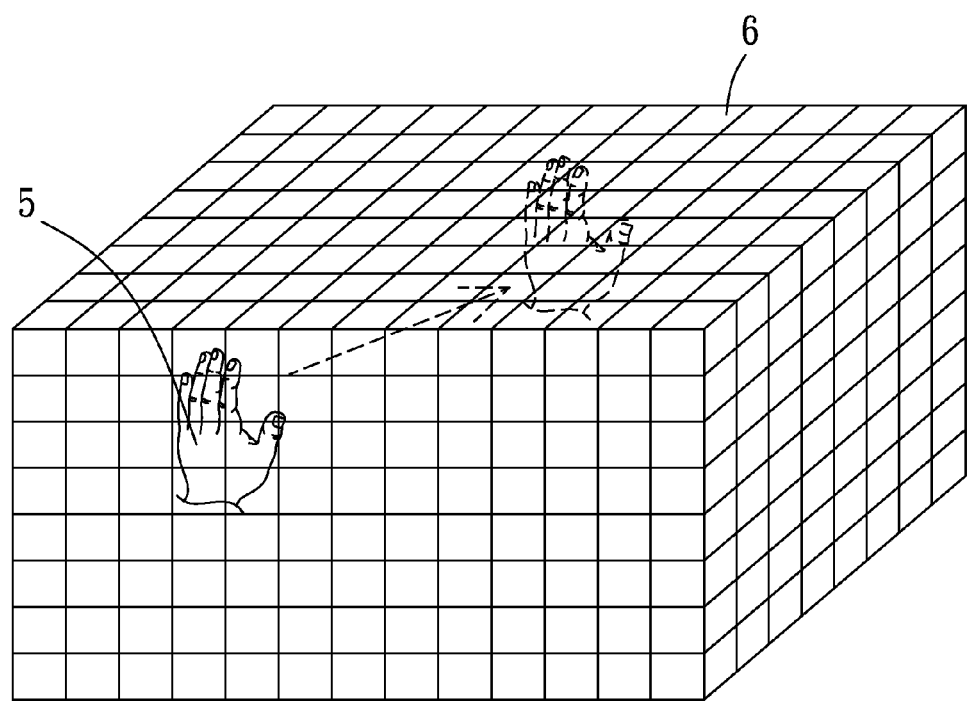
FIG. 6 is a schematic view of an application as depicted in FIG. 5.

With reference to FIGS. 5 and 6 for schematic views of a CMOS or CCD sensor of the present invention and its application respectively, each sensor 2a is a complementary metal oxide semiconductor (CMOS) or a charge coupled device (CCD) for creating a 3D image, so that when users set up and store signals related to the movements of the hand 5, each sensor 2a can perform a movement towards the front or the rear in an image grid 6 formed by each sensor 2a to add more function control signals when users set and store signals for related movements of the hand 5, in addition to the movements from left to right, from right to left, from top to bottom, from bottom to top, from upper left to lower right, from lower left to upper right, from upper right to lower left, and from lower right to upper left.

In summation of the description above, the multimedia playing device of the invention can overcome the shortcomings of the prior art effectively by adopting the plurality of sensors operated together with the central processing unit, such that after the sensors detect and receive different hand movements of a user, the central processing unit reads and determines the hand movements to control the transmission of control signals to an output unit according to the different hand movements to achieve the effects of controlling the operation of related functions and enhancing the convenience of using the multimedia playing device. Thus, the invention complies with the patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. A multimedia playing device, comprising:
    a central processing unit, having a digital signal processing unit, a memory unit and a buffer unit electrically coupled with one another;
    a plurality of sensors, electrically coupled to the digital signal processing unit; and
    an output unit, electrically coupled to the digital signal processing unit, and having a display screen;
    wherein the sensors detect a movement of a hand, the digital signal processing unit executes a function of the multimedia playing device selected from the group consisting of: power on, power off, high volume, and low volume.

2. The multimedia playing device of claim 1, wherein the sensors are infrared sensors.

3. The multimedia playing device of claim 2, wherein the memory unit is a memory or a hard disk.

4. The multimedia playing device of claim 2, wherein the buffer unit is a memory.

5. The multimedia playing device of claim 2, wherein the output unit further includes a speaker.

6. The multimedia playing device of claim 1, wherein the sensors are a complementary metal oxide semiconductor (CMOS) and a charge coupled devices (CCD) respectively.

7. The multimedia playing device of claim 6, wherein the memory unit is a memory or a hard disk.

8. The multimedia playing device of claim 6, wherein the buffer unit is a memory.

9. The multimedia playing device of claim 6, wherein the output unit further includes a speaker.

10. The multimedia playing device of claim 1, wherein the memory unit is a memory or a hard disk.

11. The multimedia playing device of claim 1, wherein the buffer unit is a memory.

12. The multimedia playing device of claim 1, wherein the output unit further includes a speaker.

13. The multimedia playing device of claim 1, further comprising a power supply unit electrically coupled to the digital signal processing unit.

14. The multimedia playing device of claim 1, further comprising a camera unit, a flash light, a USB port, a remote-control receiver, a card reader, an audio decoder, an audio/video transmitter, a microphone or any combination of the above, electrically coupled to the digital signal processing unit, and the remote-control receiver includes a remote controller, and the audio decoder is coupled to an earphone, and the audio/video transmitter is coupled to an audio/video input/output unit.

* * * * *